United States Patent [19]

Allgeier

[11] Patent Number: 5,995,972
[45] Date of Patent: Nov. 30, 1999

[54] SYSTEM AND METHOD FOR RETRIEVING DATA

[75] Inventor: Axel J. Allgeier, Parker, Colo.

[73] Assignee: J.D. Edwards World Source Company, Denver, Colo.

[21] Appl. No.: 08/774,427

[22] Filed: Dec. 30, 1996

[51] Int. Cl.[6] .................................................. G06F 17/30
[52] U.S. Cl. ................................ 707/103; 707/2; 707/3; 707/10
[58] Field of Search .................................. 707/10, 8, 103, 707/2, 3; 395/600; 340/568

[56] References Cited

U.S. PATENT DOCUMENTS

| | | | |
|---|---|---|---|
| 5,329,628 | 7/1994 | Yamamoto et al. | 395/425 |
| 5,475,836 | 12/1995 | Harris et al. | 395/600 |
| 5,506,984 | 4/1996 | Miller | 395/600 |
| 5,557,792 | 9/1996 | Josten et al. | 707/8 |
| 5,560,005 | 9/1996 | Hoover et al. | 707/10 |
| 5,689,238 | 11/1997 | Cannon, Jr. et al. | 340/568 |
| 5,696,695 | 12/1997 | Dedrick | 707/10 |
| 5,721,904 | 2/1998 | Ito et al. | 395/600 |

OTHER PUBLICATIONS

"Microsoft Systems Management Server", Microsoft Corporation, Redmond, WA, Jan. 1994.
"Microsoft Systems Management Server for Windows NT Administrator's Guide", Document No. 66254, Microsoft Corporation, Redmond, WA. Jan. 1993–1995.
"Future–Proof Solutions", J.D. Edwards & Co., Denver, CO, Jan. 1995.
"Case Tools and 4GLs: The Enterprise Distinction", J.D. Edwards & Co., Denver, CO, Jan. 1995.
"OneWorld and the Event–Driven Model", J.D. Edwards & Co., Denver, CO, Jan. 1995.
"OneWorld Integrated Toolset Highlights", J.D. Edwards & Co., Denver CO, Jan. 1995.

*Primary Examiner*—Wayne Amsbury
*Assistant Examiner*—Cheryl Lewis
*Attorney, Agent, or Firm*—Fenwick & West LLP

[57] ABSTRACT

A computing system according to the present invention includes data having a primary access location in the system and having a secondary access location in the system. The system also includes a computer running an application, where the application requests for the data having the primary and secondary access locations. In response to the application requesting the data, middleware on the computer determines whether the requested data is at the primary access location. If the data is at the primary access location, the middleware retrieves the requested data from the primary access location and sends the requested data to the application. In response to the data not being found at the primary access location, the middleware retrieves the data from the secondary access location. The middleware then sends the requested data to the application and stores a copy of the requested data at the primary access location. The middleware is implemented as software.

18 Claims, 7 Drawing Sheets

SYSTEM AND METHOD FOR RETRIEVING DATA

RELATED APPLICATIONS

The subject matter of this application is related to the subject matter in the application Ser. No., 08/774,513, titled "System and Method for Distributing Objects and Using Distributed Objects" filed on Dec. 30, 1996, by Axel Allgeier, pending, the contents of which are incorporated by reference as if fully disclosed herein.

FIELD OF INVENTION

This invention relates generally to data retrieval on client/server systems, and more particularly to a client/server system that copies and retrieves data on an as needed basis among various client and server computers.

BACKGROUND OF THE INVENTION

Modern data processing systems are often implemented as distributed computing environments, such as "client/server" configurations in which a number of "client" computers, typically personal computers or workstations, communicate with one or more "server" computers and request server computers to perform processing tasks.

To promote network efficiency, objects, such as database tables, are often distributed among client and server computers. In particular, database tables are often stored on a server computer (such as a mainframe computer), where client computers can access the database tables on the server computer.

Applications running on client computers may call for data in such database tables on the server computer, and consequently the server computer must transfer data to the client computers. Known systems will automatically and periodically transfer large amounts of data from the database tables to the client computers. However, periodically transferring large amounts of data to client computers can be very time consuming and wastes valuable system resources since not all client computers will need all the data being transferred. Moreover, the transferred data can become out of date because there may be frequent updates between transfers.

Therefore, it is desirable to have a more reliable and efficient method for transferring data stored on a server computer to a client computer than is currently known.

SUMMARY OF THE INVENTION

The present invention provides a system and method for retrieving data. A computer system according to the present invention includes data having a primary access location in the system and having a secondary access location in the system. The system also includes a computer executing an application, where the computer has middleware performing a just-in-time-replication (JITR) function. The application executing on the computer requests the data having the primary and secondary access locations and, in response to the JITR function being activated, the middleware on the computer determines whether the requested data is at the primary access location. In response to the data being at the primary access location, the middleware retrieves the requested data from the primary access location and sends the requested data to the application. In response to the data not being found at the primary access location, the middleware retrieves the data from the secondary access location. The middleware then sends the requested data to the application and stores a copy of the requested data at the primary access location.

In one embodiment, the computer system keeps the data at primary access locations current by periodically cleaning out data from the primary access locations. In yet another embodiment, if the JITR function is activated and if requested data exists at a primary access location, the computer system determines whether the requested data is current at the primary access location before retrieving the requested data from the primary access location. If the requested data is current at the primary access location, the requested data is retrieved from the primary access location. If the requested data is not current at the primary access location, the requested data is retrieved from the secondary access location, not from the primary access location. The old data is then written over at the primary access location with the newly retrieved data.

In one embodiment, the computer system according to the present invention is a client/server system having at least one client computer and at least one server computer. The client computer executes an application needing data, wherein the data has a primary access location and a secondary access location. The primary access location is the client computer and the secondary access location is the server computer. In response to the application requesting the data, middleware on the client computer ("the client middleware") determines whether the requested data is stored on the client computer. If the requested data is stored on the client computer, a copy of the data is sent to the application. If the requested data cannot be found on the client computer, the requested data is retrieved from the server computer by middleware on the server computer.

The above described embodiment provides a more efficient system than is currently known for retrieving data used by applications in a distributed computing environment. One reason for the increased efficiency is that small amounts of data are transferred from the server computer to the client computer on an as needed basis, rather than large amounts of data being transferred on a fixed, periodic basis regardless of need. Additionally, data retrieved from the server computer is copied and stored on the client computer, and, therefore, if such data is requested again, it will not have to be transferred from the server computer to the client computer (providing such data is current on the client computer).

The features and advantages described in this specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 6a provides a portion of the flow chart, and FIG. 6b provides a portion of the flow chart.

DETAILED DESCRIPTION OF THE PREFERRED EMBODIMENT

Figure 1:
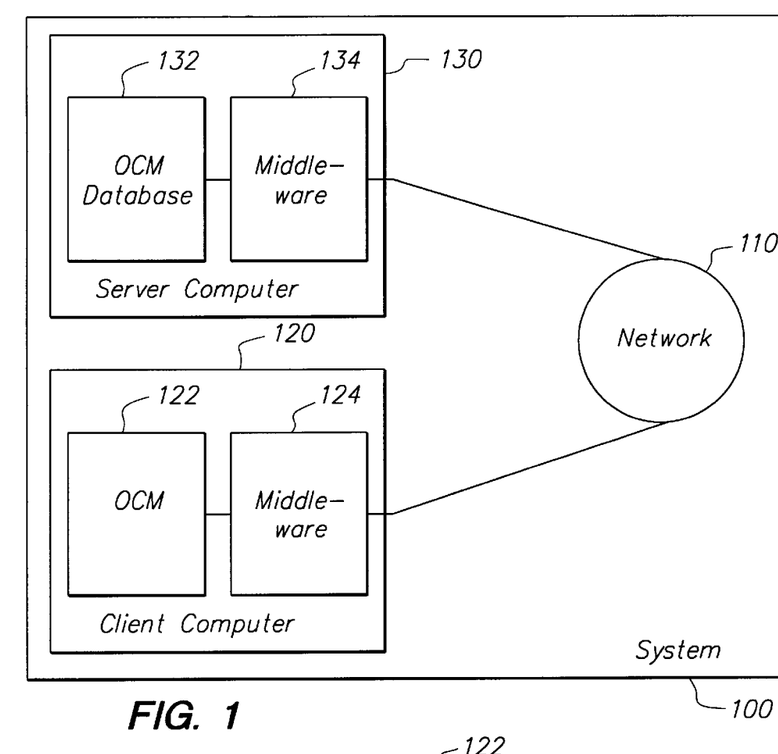
FIG. 1 is a block diagram of a distributed computing system according to the present invention.

FIG. 1 illustrates an example of a distributed computing system 100 according to the present invention. The distributed computing system 100 includes a client computer 120 and a server computer 130, where objects are distributed in the system 100 among the client and server computers 120, 130. The client and server computers 120, 130 are coupled together by a network 110. Distributed computing systems according to the present invention can vary as to the number of client and server computers 120, 130, and the system 100 shown in FIG. 1 is merely an example of one such system. Additionally, a computer in the system 100 can function as both a client computer and a server computer.

The client computer 120 includes an object configuration manager (OCM) 122 and client middleware 124. Server computer 130 includes server middleware 134 and an OCM database 132 which stores access information for all distributable objects (e.g., database tables) in the network 110. The access information for a distributed object indicates the location(s) at which the object can be accessed by computers in the system 100, and, for each location at which the object can be accessed, the access information indicates the users, applications, and computers which can access the object at that location.

Middleware is a conventional type of software that provides a layer of a client/server architecture that resides between the client and the server and allows client and server computers running on different platforms and by different protocols to interface during run-time. For more information on middleware see, e.g., Alex Berson, *Client/Server Architecture* (2d ed. 1996); P. Bernstein, *Middleware: A model for Distributed System Services*, 39 COMMUNICATIONS OF THE ACM AT 86–98 (February 1996), the contents of which are hereby incorporated by reference as if fully set forth herein.

In a preferred embodiment, the OCM 122 is a software application created by known programming methods. In one embodiment, the OCM 122 is the OCM described in the above referenced patent application incorporated by reference.

Through the OCM 122, a user of a client computer 120 can instruct the system 100 to perform various actions with respect to database tables. Such actions include creating a database table on a particular computer, deleting a database table on a particular computer, and copying a database table from one computer to another computer. Such actions also include changing or identifying the location at which a database table can be accessed by computers in the system 100. A request to identify or change the location at which a database table can be accessed specifies the location at which the database table can be retrieved by computers in the system 100. The user can limit the effect of the request to specific computers, users, and/or applications. For instance, a change in access location may only apply to certain users, and different users may access a database table at different locations.

The OCM 122 updates the access information in the OCM database 132 to reflect any changes resulting from actions performed through the OCM 122. For instance, the OCM 122 updates the OCM database 132 to reflect changes in the location of a database (including the addition of new locations) or changes in the accessibility of a database table.

In addition, when an action is performed through the OCM 122, the OCM 122 determines whether other computers in the system 100 are affected by the action. Another computer is affected by the action if the access information for an object, such as a database table, changes for that computer. If other computers are affected by the requested action, the OCM 122 sends a notification message to the affected computers to notify them of the change.

Figure 2:
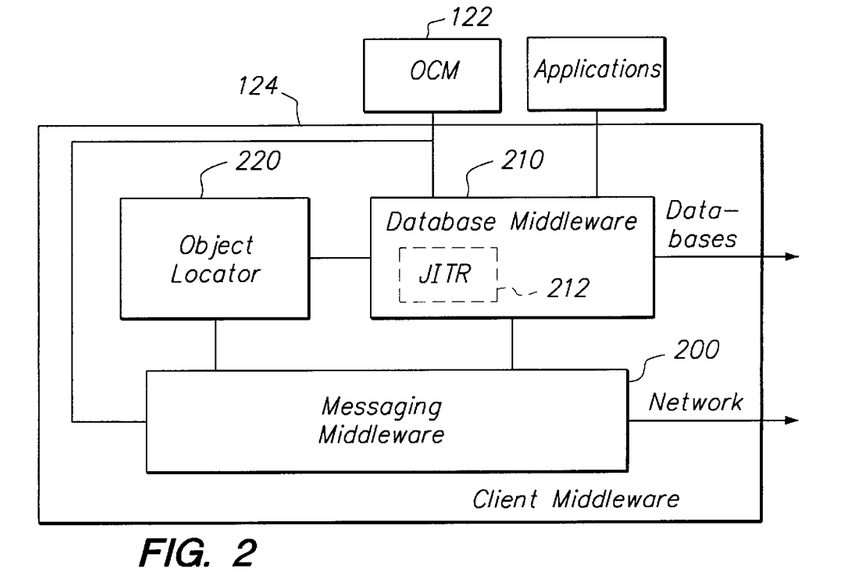
FIG. 2 is a block diagram of middleware used on a client computer for processing database table tasks according to the present invention.

FIG. 2 illustrates the middleware 124 used on the client computer for processing database table tasks. The client middleware 124 includes messaging middleware 200, database middleware 210, and an object locator 220.

The messaging middleware 200 sends information over the network 110 and receives information from the network 110. The messaging middleware 200 interfaces with the network 110 using conventional hardware, such as standard TCP/IP sockets. Notification messages created by the OCM 122 are sent to the messaging middleware 200, which sends the messages across the network 110.

The object locator 220, which will be discussed in further detail below, stores access information for database tables (as well as other objects) in the system 100. As discussed above, the access information for a database table indicates the location at which a database table can be accessed, and, for each location at which the database table can be accessed, the access information indicates the users, applications, and computers which can access the database table at that location. When the client computer 120 is started up, access information from the OCM database 132 is cached in the object locator 220. While the client computer 120 is running, the object locator 220 receives the above described notification messages from other computers for any access information changes that affect the client computer 120. The data carried in the notification messages is cached into the object locator 220, thereby allowing database tables to be distributed dynamically through the OCM 122. This is due to the fact that a user will not have to close out of an application to have the most updated access information cached into the object locator 220.

The database middleware 210 communicates with databases on the client computer 120 in a conventional manner. In response to the OCM 122 receiving a request to perform an action with respect to a database table, the OCM 122 sends the request to the database middleware, and, in response to the database middleware receiving the request from the OCM 122, the database middleware processes the request (as will be discussed in more detail below). If the database middleware needs to locate a database, the object locator 220 sends stored access information for the database table to the database middleware 210.

If an application running on the client computer 120 needs data from a database table, the application will send a request to the database middleware 210, which will retrieve the data. One of the functions the database middleware 210 performs is a just-in-time-replication (JITR) function 212. The request for the data from the application indicates whether or not the JITR function 212 is activated, and if it is activated, the request indicates primary and secondary access locations for the data. The JITR function 212 retrieves the requested data from the primary access location if the requested data is located at the primary access location. Otherwise, the JITR function 212 retrieves the requested data from the secondary access location, sends it to the requesting application, and stores a copy of it at the primary access location.

More specifically, if the database middleware 210 receives a request for data from an application and if the JITR function 212 is activated for the requested data, the database middleware 210 sends a request for the data to the computer designated in the request as the primary access location. This sending step need not be performed if the computer designated as the primary access location is the same computer on which the database middleware receiving the application request resides. The database middleware at the primary access location ("the primary database middleware") determines if the requested data is at the primary access location. If the data is at the primary access location, the primary database middleware copies the data and sends the copy to the requesting application. If the requested data is not located at the primary access location, the database middleware 210 receiving the request from the application sends a request for the data to a location designated in the request as a secondary access location. This sending step need not be performed if the computer designated as the secondary access location is the same computer on which the database middleware receiving the application request resides. Database middleware at the secondary access location ("secondary database middleware") determines whether the requested data is at the secondary location. If the requested data is at the secondary location, a copy of the requested data is made and the copy is sent back to the requesting database middleware 210. The requesting database middleware 210 then has a copy of the data stored at the primary access location and sends a copy to the requesting application.

In one embodiment, the computer system keeps the data at primary access locations current by periodically cleaning out data from the primary access locations. In yet another embodiment, if the JITR function 212 is activated and if requested data exists at a primary access location, the computer system determines whether the requested data is current at the primary access location before retrieving the requested data from the primary access location. If the requested data is current at the primary access location, the requested data is retrieved from the primary access location. If the requested data is not current at the primary access location, the requested data is retrieved from the secondary access location, not from the primary access location. The old data is then written over at the primary access location with the newly retrieved data.

One advantage of the JITR function 212 it that is provides a more efficient and reliable way to transfer data from a server computer 130 to a client computer 120 than known methods. If a client computer 120 running an application is made the primary access location and if a server computer 130 storing data requested by the application is made the secondary access location, then, in response to a request for the data, the database middleware 210 on the client computer 120 first searches for the requested data on the client computer 120. In response to the requested data not being on the client computer 120, the requested data is retrieved from the server computer 130. This method promotes efficiency because small amounts of data are transferred from the server computer 130 to the client computer 120 on an as needed basis, rather than large amounts of data being transferred on a fixed, periodic basis regardless of need. Additionally, data retrieved from the server computer 130 is copied on to the client computer 120, and, therefore, if such data is requested again, it will not have to be transferred from the server computer 130 to the client computer 120 (providing the data on the client computer 120 has not been cleaned out).

Figure 3:
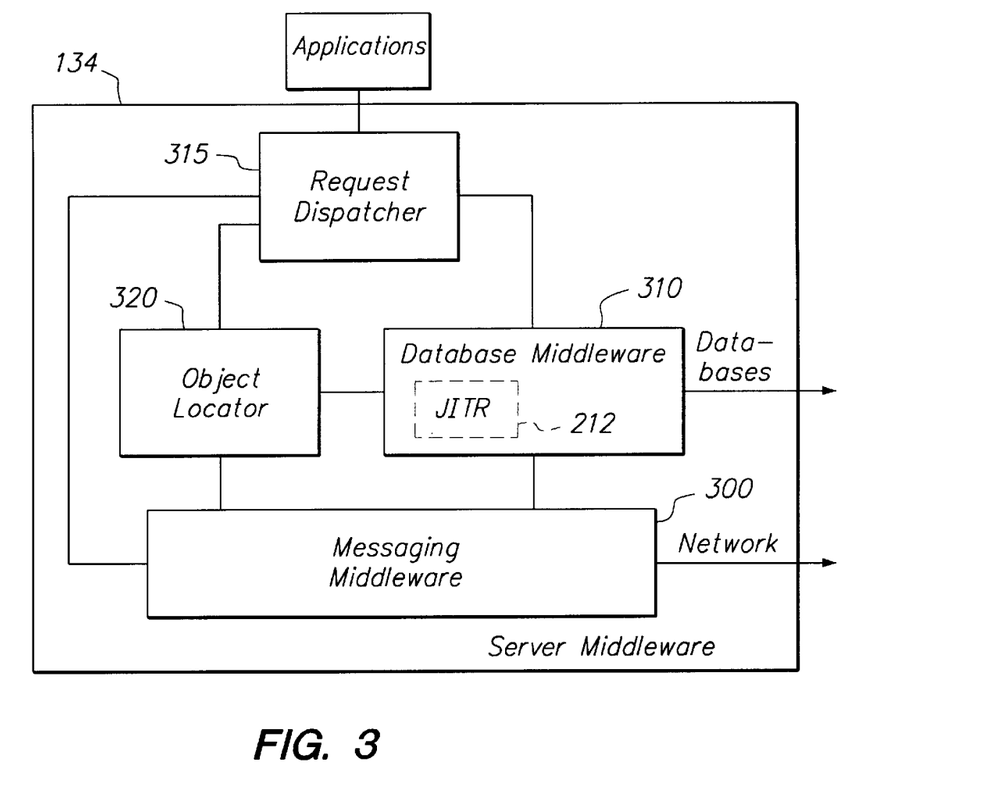
FIG. 3 is a block diagram of middleware used on a server computer for processing database table tasks according to the present invention.

FIG. 3 illustrates the middleware used on the server computer 130 for processing database tasks. The server middleware 134 includes messaging middleware 300, database middleware 310, a request dispatcher 315, and an object locator 320.

The server messaging middleware 300 receives messages from the network 110 and sends messages over the network 110. The messaging middleware 300 interfaces with the network 110 using conventional hardware, such as standard TCP/IP sockets. When the messaging middleware 300 receives messages, it sends them to the request dispatcher 315.

Upon receiving a message, the request dispatcher 315 determines whether it needs to be formatted for the server 130. If the message needs to be formatted, the request dispatcher 315 puts the message in a format suitable for use by the server computer 130. Next, the request dispatcher 315 passes the request to the proper middleware component. For instance, if the message is a notification message, the request dispatcher 315 sends the notification message to the object locator 320. If the message is a request to perform an action with respect to a database table, the request dispatcher 315 sends the message to the database middleware 310. In one embodiment, the request dispatcher 315 is the request dispatcher described in the above referenced patent application incorporated by reference.

The database middleware 310 interfaces with databases on the server 130 in a conventional manner. In response to receiving a request, via the request dispatcher 315, the database middleware 310 performs the requested action, such as creating, copying or deleting a database. After the requested action has been performed, the database middleware 310 sends results, which may be an acknowledgment that the request has been carried out or may be a copy of data, to the messaging middleware 300. The messaging middleware 300 then transmits the results to the requesting computer.

The server database middleware 130 performs the same JITR function 212 described with respect to the client database middleware 210. Namely, if an application on the server computer 130 requests data and if the JITR function 212 is activated for the requested data, the JITR function 212 will retrieve the requested data from a primary access location if the requested data is located at the primary access location. Otherwise, the JITR function will retrieve the requested data from a secondary access location, send it to the requesting application, and store a copy of it at the primary access location.

If the server database middleware 310 needs to locate a database table, the object locator 320 on the server computer sends stored access information on that database table to the database middleware 310. As with the object locator 220 on the client computer, the server object locator 320 is updated during run time with access information changes by receiving notification messages from other computers. The notification messages are received at the messaging middleware 300 and passed to the request dispatcher 315, which sends the notification messages to the object locator 320.

Figure 4:
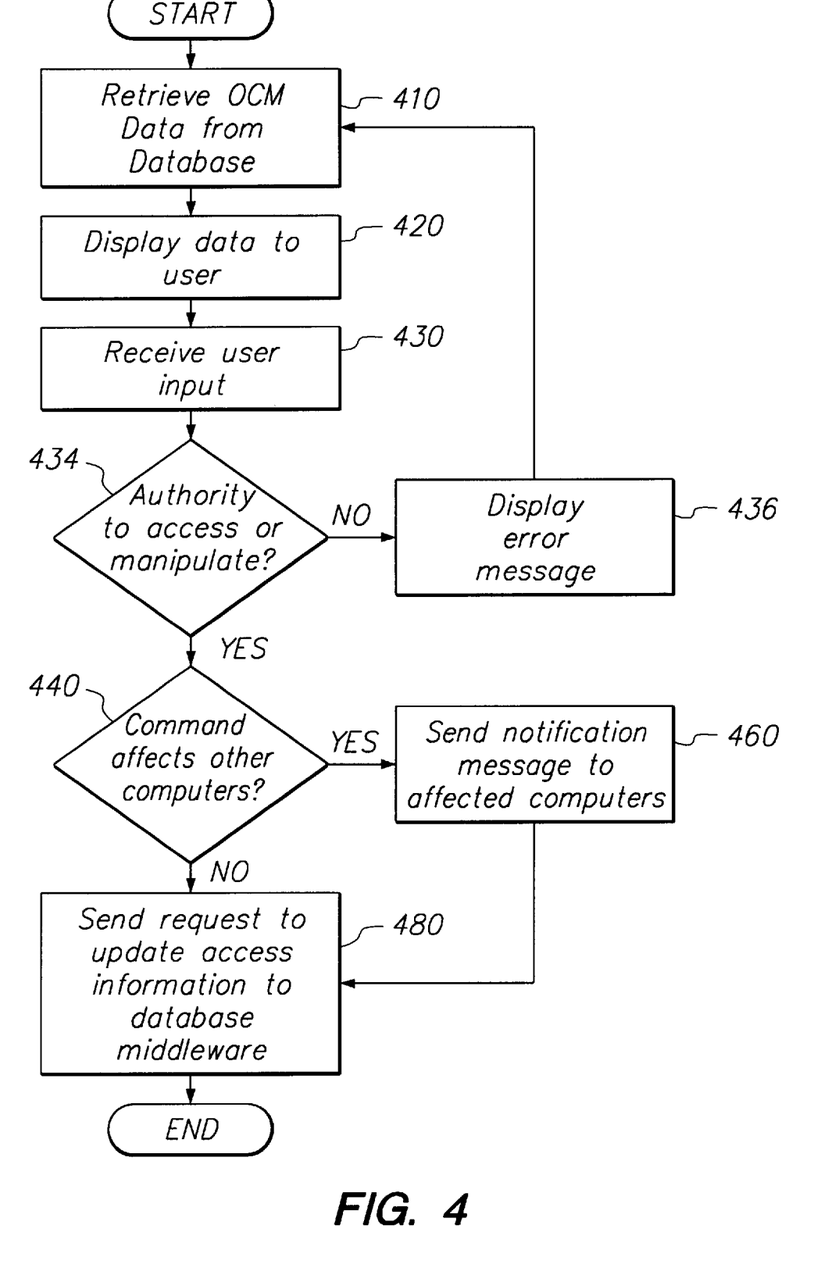
FIG. 4 is a flow chart of the operation of an Object Configuration Manager according to the present invention.

A user activates the JITR function 212 through the OCM 122. FIG. 4 illustrates the method of activating the JITR function 212 through the OCM 122. In response to a user running the OCM application, the OCM 122 retrieves 410 from the OCM database access information for all distributable objects (e.g. database tables) in the network 110. After retrieving the access information, the OCM displays 420 the access information on the computer screen of the user's client computer 126.

A user desiring to activate the JITR function 212 for a database tables gives the OCM 122 a command to do so. The command specifies the primary and secondary access locations for the database table. The command also specifies the users, applications, and computers for which the command applies. In response to the OCM 122 receiving 430 the user's command, the OCM 122 determines 434 (from the data retrieved from the OCM database) whether the user has authority to manipulate or access the object designated in the command. If the user does not have such authority, an error message is displayed 436, and the OCM application starts over. If the user does have such authority, the OCM 122 ascertains 440 whether the requested action in the command affects other computers. An action affects another computer if the action affects the ability of a computer, or of a user or application associated with the computer, to access an object. If the action affects other computers, the OCM 122 sends 460 a notification message notifying affected computers of the action so that, if the affected computers call on the database table being processed by the OCM 122, they have the most updated access information. Regardless of whether other computers are notified of the requested action, the OCM 122 sends 480 a request to the client database middleware to update the access information in the OCM database 132. Access information in the OCM database 132 is updated to indicate that the JITR function 212 is activated for a particular database table and to indicate the primary and secondary access locations for the database table.

Figure 5:
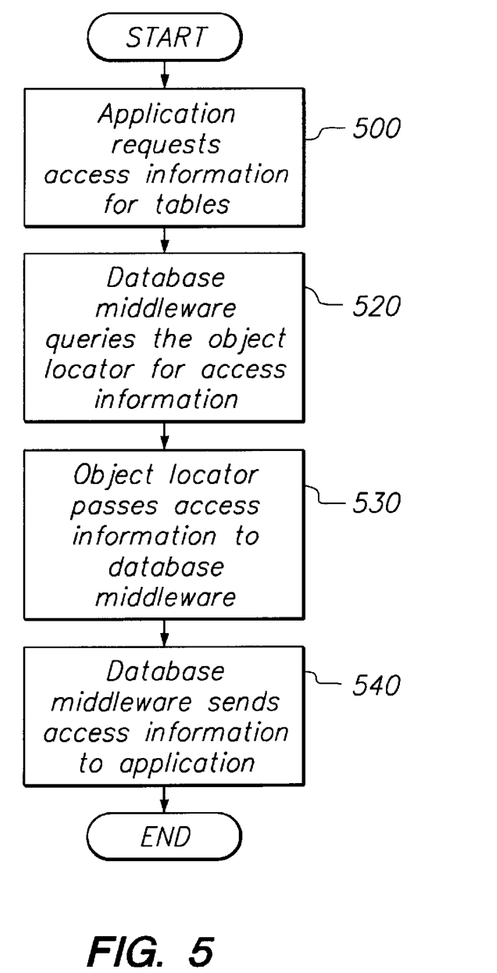
FIG. 5 is a flow chart of the operation of database middleware in response to the execution of an application using database tables.

FIG. 5 illustrates a method in accordance with the present invention when an application using database tables is executed. As an example, we will assume the application is on the client computer 120, but the application could be on the server computer 130. In response to an application being executed (opened), the application sends a request 500 to the database middleware 210 to retrieve the access information for all data that the application may need. The database middleware 210 queries 520 the object locator 220 for the access information, and the object locator 220 passes 530 the access information to the database middleware 210. The access information indicates a primary access location for the database table. The access information also indicates whether the JITR function 212 is activated for that table, and, if the JITR function 212 is activated, the access information also indicates a secondary access location for the table. The database middleware then sends 540 the access information back to the application.

Figure 6A:
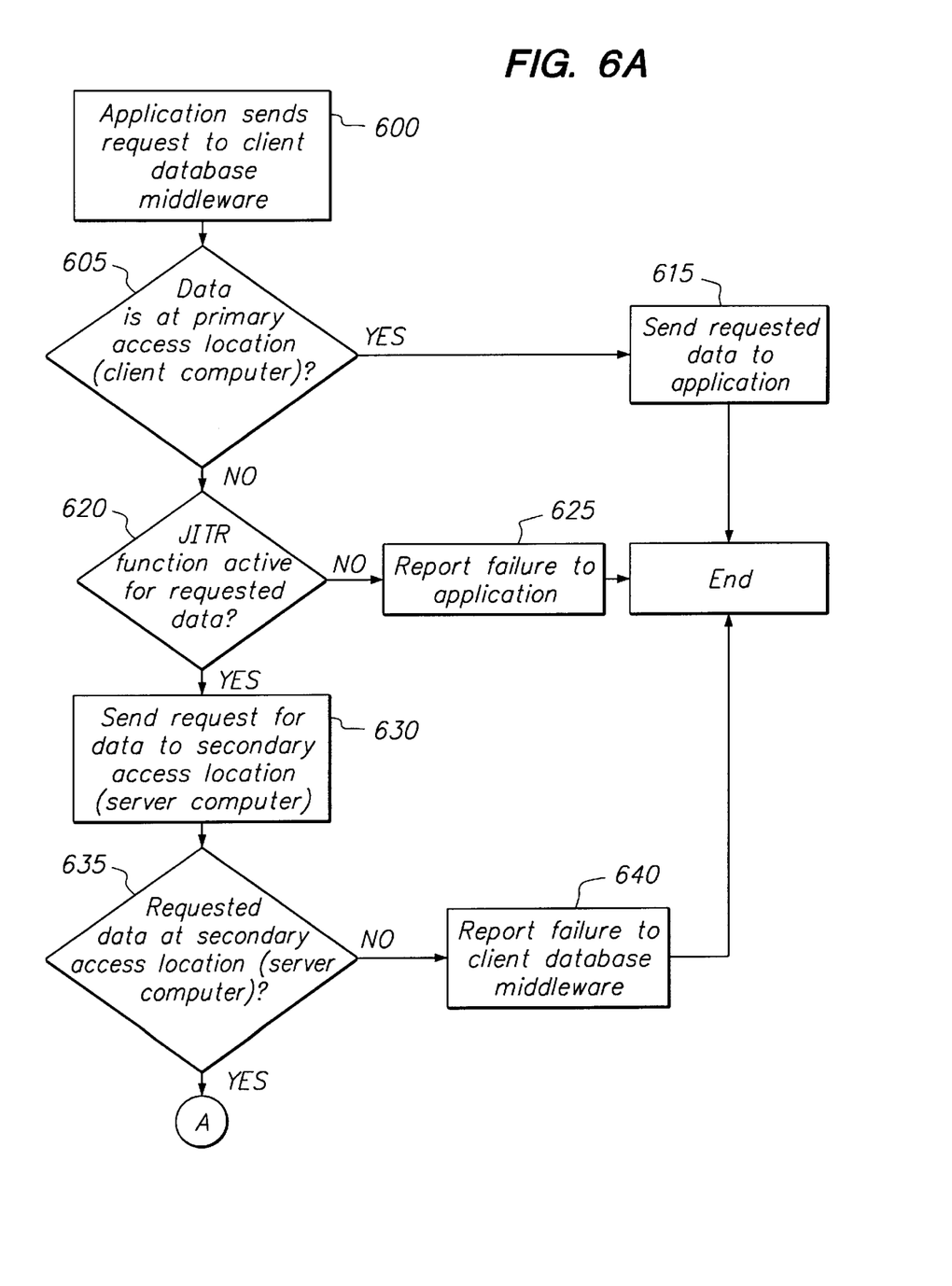
FIGS. 6a and 6b collectively provide a flow chart illustrating an example of a method of the distributed computing system for responding to a request of an application for data.
Figure 6B:
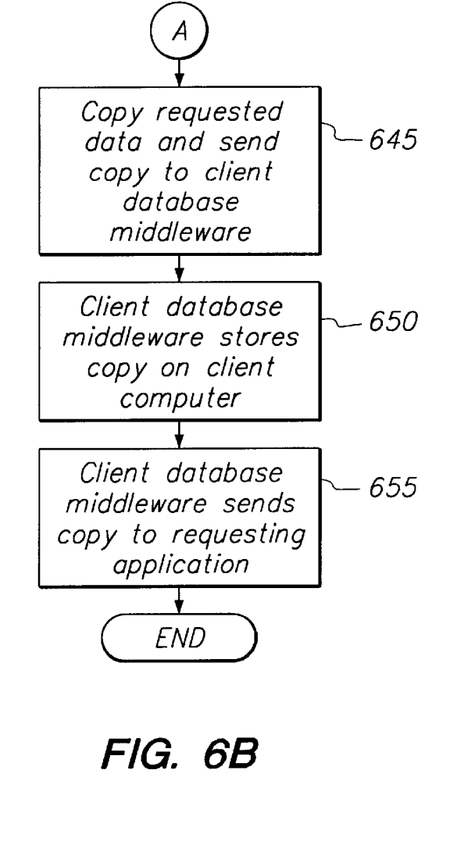

FIGS. 6a and 6b illustrate the processing of system 100 in responding to an application requesting data, where the application is executing on a client computer 120. In this example, the client computer 120 is the primary access location and the server computer 130 is the secondary access location. The selections of primary and secondary access locations are chosen arbitrarily in this example, and other computers could be selected as the primary and secondary access locations.

Referring now specifically to FIG. 6a, in response to the executing application needing data from a database table, the application sends 600 a request for the data to the client database middleware 210. The request includes the access information retrieved in accordance with the method illustrated in FIG. 5. In this example, the access information indicates that the primary access location is the client computer 120 and the secondary access location is the server computer 130. In response to receiving the request and the access information, the client database middleware 210 determines 605 whether the requested data is in a database table on the client computer 120 (or in a database that the client computer 120 can directly access). If the requested data is stored on the client computer (or in a database that the client computer 120 can directly access), the requested data on the client computer is sent 615 to the requesting application.

In response to the requested data not being found at the client computer 120, the client database middleware 210 determines 620 whether the JITR function 212 is activated for the database table having the requested data (the request from the application indicates whether the JITR function 212 is activated or not). If the JITR function 212 is not activated, the client database middleware 210 informs 625 the application that the requested data could not be found. If the JITR function 212 is activated, the client database middleware 210 sends 630 a request for the data to the server database middleware 210. The server database middleware 310 determines 635 whether the requested data is in a database table on the server 130 (or in a database that the server computer 130 can directly access). If the requested data is not stored on the server computer 130, the server database middleware 310 sends 640 a message to the client database middleware 210 stating that the requested data could not be found, and the client database middleware 210 informs 640 the application that the requested data could not be found.

Referring now also to FIG. 6b, if the server database middleware 310 finds the requested data, it copies 645 the requested data and sends 645 the copy to the client database middleware 210. The client database middleware 210 then stores 650 a copy of the requested data in an existing database table on the client computer 120 or, if no corresponding table exists, creates a new database table on the client computer for the requested data so that the requested data will be on the client computer 120 the next time an application requests the data. After the requested data is stored 650 on the client computer 120, the client database middleware 210 sends 655 a copy of the requested data to the requesting application.

Figure 7:
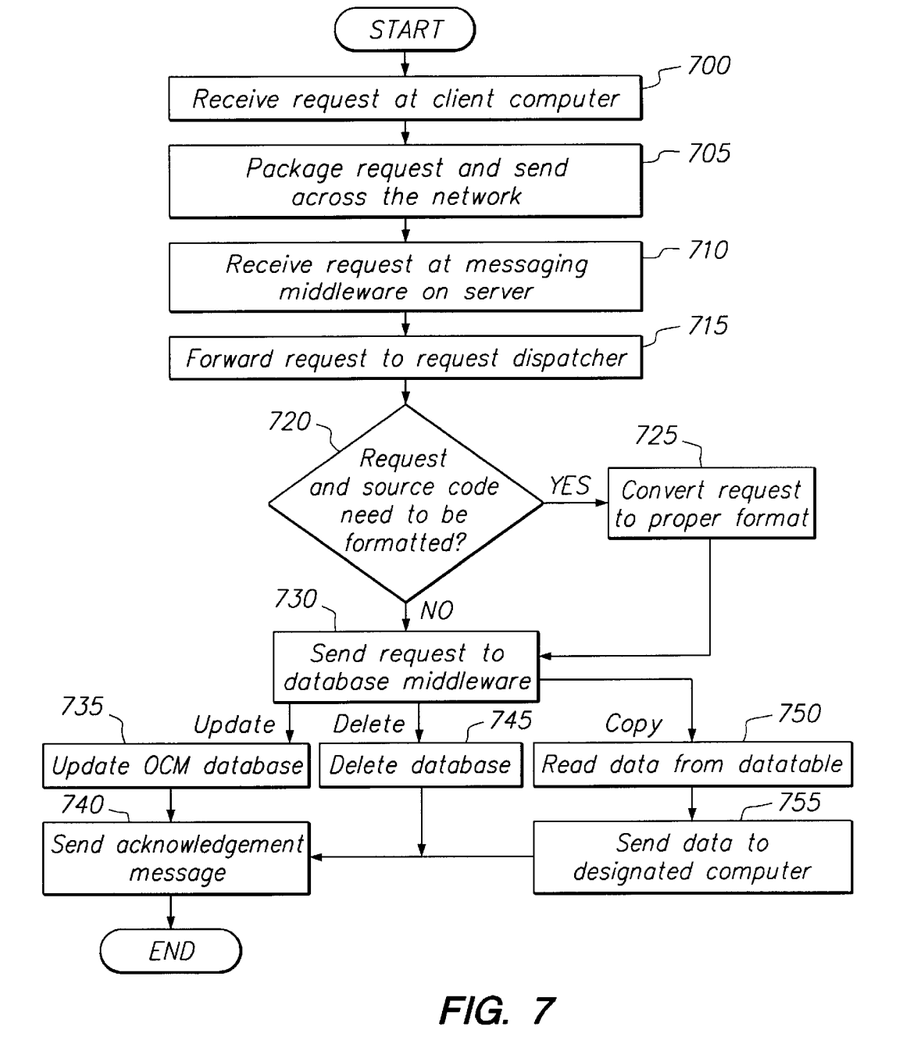
FIG. 7 is a flow chart of the operation of the database middleware on the client and server computers in response to the client computer sending a database processing request to the server computer.

FIG. 7 illustrates the operation of the database middleware on a client computer 120 and a server computer 130 when the client database middleware 210 sends a request to the server database middleware 310. The database middleware 210 on the client computer 120 receives 700 a request from an application or from the OCM 122 to perform an action with request to a database table. The database middleware 210 packages 705 the request, and the messaging middleware 200 sends 705 the request, via the network 110, to a server 130 designated in the request. If the request is one to update the OCM database 132, the request is sent to the server 130 having the OCM database 132. The request is received 710 at the messaging middleware 300 of the server 130 which forwards 715 the request to the request dispatcher 315. The request dispatcher 315 determines 720 whether the request needs to be formatted. If so, the request dispatcher 315 converts 725 the request to a proper format.

The request is sent 730 to the server database middleware 310, which determines the type of the request. If the request is one to update the access information in the OCM database 132, the database middleware 310 updates 735 the access information in the OCM database 132. Such a request will likely be received when a user acts upon a database table or other object through the OCM 122.

If the database middleware 310 receives a request to delete a database, the database middleware 310 deletes 745 the database from storage. If the request is to copy actual data from a database table to another computer, the database middleware 310 reads 750 the data to be copied from the database table and copies the data. Such a request may be received when an executing application requests data or when the user requests, through the OCM 122, to copy the data onto another computer. After the data is copied, the messaging middleware 300 sends 755 the data to the computer designated in the request. The database middleware on the computer receiving the data either stores the data in an existing database table or creates a database table from the received data. Additionally, if the data was retrieved in response to the request of an application, the database middleware on the computer receiving the data sends the data to the requesting application.

After the requested action has been performed, the database middleware 310 creates a message acknowledging completion of the request, and the messaging middleware 300 sends 740 the acknowledgment message.

Figure 8:
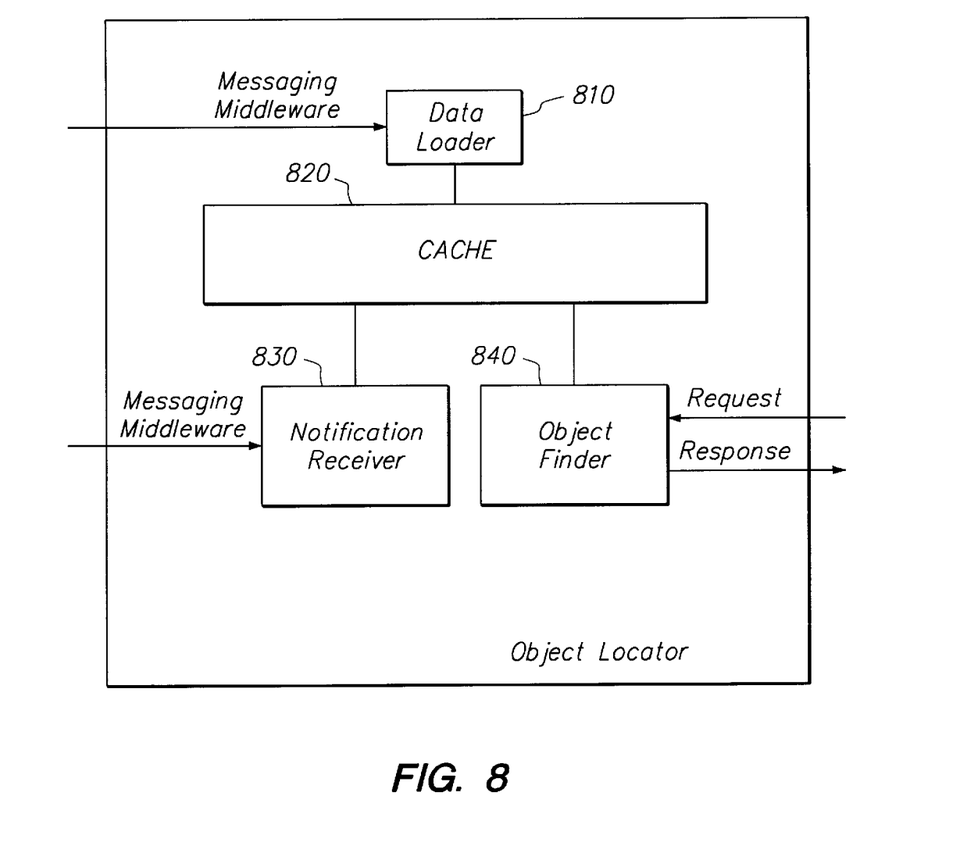
FIG. 8 is a block diagram of a object locator according to the present invention.

FIG. 8 is a block diagram of an object locator. The object locators 220, 320 in both the client and server computers 120, 130 have the elements illustrated in FIG. 8.

A data loader 810, which is a conventional interface, communicates with the database middleware to receive access information from the OCM database 132. The access information is received at the start up time of the host computer on which the object locator exists. The data loader 810 stores this information in a conventional cache 820.

A notification receiver 830, which is implemented as an application program interface, communicates with the messaging middleware to receive notification messages indicating access information updates while the host computer is running. The notification receiver 830 stores the updates in the cache 820.

An object finder 840, which is a conventional implementation of a binary search tree, receives requests from the database middleware to retrieve access information for database tables. The object finder 840 retrieves access information from the cache 820 and sends the access information to the database middleware.

From the above description, it is apparent that the invention disclosed herein provides a novel and advantageous system for retrieving data in a distributed computing environment. The foregoing discussion discloses and describes merely exemplary methods and embodiments of the present invention.

As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method of retrieving data requested at a first node in a computer network, wherein the first node has a first database and wherein the first node is coupled to a second node having a second database, the method comprising the steps of:

maintaining access information indicating that a primary access location for select data is the first database and that a secondary access location for the select data is the second database;

receiving a request for the select data at the first node, the request generated by an application executing on the first node;

obtaining the access information for the select data primary access location;

initially querying the select data primary access location to determine whether the select data exists in the first database;

in response to determining that the select data exists in the first database, retrieving the select data from the first database;

in response to determining that the select data does not exist in the first database, sending a request from the first node to the second node for the select data;

obtaining the access information for the select data secondary access location;

in response to the request from the first node, subsequently querying the select data secondary access location to determine whether the select data exists in the second database; and in response to determining that the select data exists in the second database, retrieving the select data from the second database, sending the select data to the first node, and writing the select data to the first database.

2. The method of claim 1, further comprising:

maintaining the access information at each of a plurality of nodes in the computer network of the primary and secondary access locations for different types of data.

3. A computer program embodied in a tangible medium and capable of being executed by a computer for performing the method of claim 1.

4. A method of retrieving data requested at a first node in a computer network, wherein the first node has a first database and wherein the first node is coupled to a second node having a second database, the method comprising the steps of;

maintaining access information indicating that a primary access location for select data is the first database and that a secondary access location for the select data is the second database;

receiving a request for the select data at the first node, the request generated by an application executing on the first node;

obtaining the access information for the select data primary access location;

initially querying the select data primary access location to determine whether the select data exists in the first database;

in response to determining that the select data exists in the first database, determining at the first node whether the select data in the first database is current;

in response to determining that the select data exists in the first database and is current, retrieving the select data from the first database;

in response to determining that the select data does not exist in the first database or in response to determining that the select data is not current in the first database, sending a request from the first node to the second node for the select data;

obtaining the access information for the select data secondary access location;

in response to the request from the first node, subsequently querying the select data secondary access location to determine whether the select data exists in the second database; and in response to determining that the select data exists in the second database, retrieving the select data from the second database, sending the select data to the first node, and writing the select data to the first database.

5. The method of claim 4, further comprising:

maintaining the access information at each of a plurality of nodes in the computer network of the primary and secondary access locations for different types of data.

6. A computer network comprising:

a first node having a first database, a second node having a second database, and middleware means including a first object locator for enabling the querying of the first database and the second database, the object locator adapted to maintain access information indicating that a primary access location for the select data is the first database and that a secondary access location for the select data is the second database, the middleware means adapted to receive a request for the select data from an application executing on the first node, adapted to obtain the access information for the select data primary access location and to initially query the select data primary access location to determine whether the select data exists in the first database in response to receiving the request, and adapted to read the select data from the first database in response to determining that the select data exists in the first database; and the middleware means further adapted to obtain the access information for the select data secondary access location and to subsequently query the select data secondary access location to determine whether the select data exists in the second database in response to determining that the select data does not exist in the first database, and adapted to send the requested data to the first database in response to determining that the requested data exists in the second database.

7. The computer network of claim 6, wherein the middleware means further includes a second object locator adapted to maintain second node access information indicating the primary and secondary access locations for data which may be needed by the second node.

8. The computer network of claim 6, wherein the first object locator is adapted to maintain other access information indicating the primary and secondary access locations for other data which may be needed by the first node.

9. A computer network comprising:

a first node having a first database, a second node having a second database, and middleware means including a first object locator for enabling the querying of the first database and the second database, the object locator adapted to maintain access information indicating that a primary access location for the select data is the first database and that a secondary access location is the second database, the middleware means adapted to receive a request for the select data from an application executing on the first node, adapted to obtain the access information for the select data primary access location and to initially query the select data primary access location to determine whether the select data exists and is current in the first database in response to receiving the request, and adapted to read the select data from the first database in response to determining that the select data exists in the first database and is current in the first database; and p1 the middleware means further adapted to obtain the access information for the select data secondary access location and to subsequently query the select data secondary access location to determine whether the select data exists in the second database in response to determining that the select data does not exist or is not current in the first database, and adapted to send the selected data to the first database in response to determining that the requested data exists and is current in the second database.

10. The computer network of claim 9, wherein the middleware means further includes a second object locator adapted to maintain second node access information indicating the primary and secondary access locations for data which may be needed by the second node.

11. The computer network of claim 9, wherein the first object locator is adapted to maintain other access information indicating the primary and secondary access locations for other data which may be needed by the first node.

12. A method of retrieving data in a computer network, the method comprising:

maintaining access information at each of a plurality of nodes in the computer network indicating a primary access location and a secondary access location for select data;

receiving a request for the select data at one of the plurality of nodes, the request generated by an application executing on said node;

obtaining the access information for the select data primary access location;

initially determining whether the select data exists at the primary access location;

in response to the select data existing at the primary access location, retrieving the select data from the primary access location and providing the select data to the application executing on said node;

in response to the select data not existing at the primary access location, obtaining the access information for the select data secondary access location and subsequently determining whether the requested data exists at the secondary access location; and in response to determining that the requested data exists at the secondary access location, retrieving the select data from the secondary access location, providing the select data to the application executing on said node, and writing the select data to the primary access location.

13. The method of claim 12, wherein the primary access location is said one node.

14. The method of claim 12, wherein different ones of the plurality of nodes maintain different access information indicating different primary and secondary access locations for the select data.

15. A computer program embodied in a tangible medium and capable of being executed by a computer for performing the method of claim 12.

16. A computer network, comprising;

database means for storing data required by an application;

middleware means for enabling the querying of said database means;

said middleware means including object locator means for maintaining access information identifying a primary access location and a secondary access location for said data on said database means;

wherein said middleware means is responsive to an application request for select data for obtaining said access information to identify a select data primary access location and a select data secondary access location for said select data, for initially querying said select data primary access location for said select data, for subsequently querying said select data secondary access location for said select data when said initial query indicates that said select data does not exist at said select data primary access location, and for causing said select data to be replicated at said select data primary access location when said subsequent query indicates that said select data does exist at said select data secondary access location.

17. A computer network according to claim 16, wherein said middleware means further includes just-in-time means for initiating said subsequent query of said select data secondary access location.

18. A computer network according to claim 16, further including object configuration means for specifying said select data primary access location and said select data secondary access location.

* * * * *

UNITED STATES PATENT AND TRADEMARK OFFICE
CERTIFICATE OF CORRECTION

PATENT NO.    : 5,995,972

DATED         : November 30, 1999

INVENTOR      : Axel J. Allgeier

It is certified that error appears in the above-identified patent and that said Letters Patent is hereby corrected as shown below:

Column 12, line 1, delete "database; and p1 the middleware" and replace with

--database;
    and the middleware--

Signed and Sealed this

Eighth Day of August, 2000

Attest:

Attesting Officer

Q. TODD DICKINSON

*Director of Patents and Trademarks*